No. 761,771. PATENTED JUNE 7, 1904.
R. KLEIN.
PHOTOGRAPHIC SHUTTER.
APPLICATION FILED DEC. 3, 1900.
MODEL. 5 SHEETS—SHEET 2.
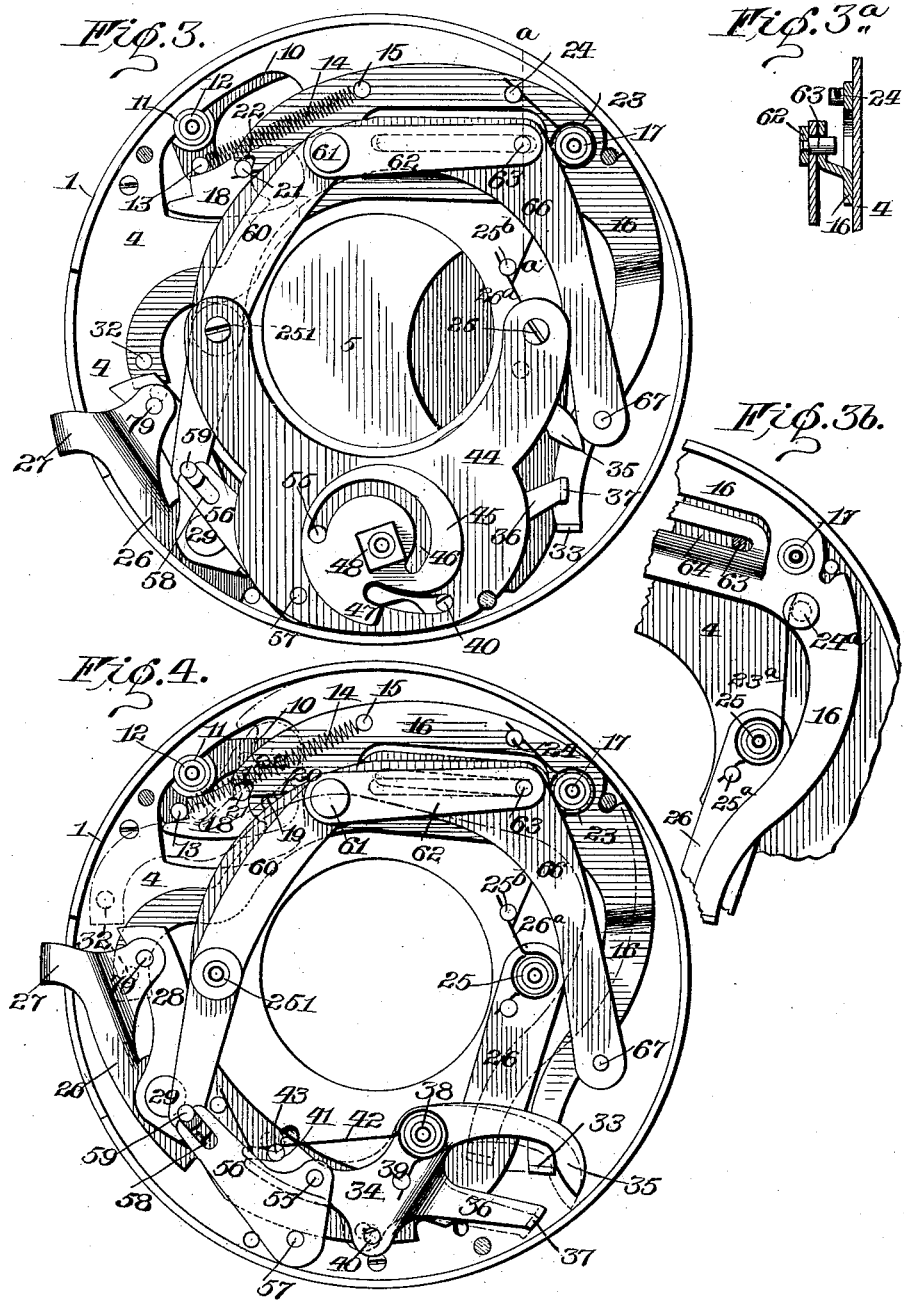
Witnesses.
G. Willard Rich.
Walter B. Payne.
Inventor.
Rudolph Klein
by Frederick F. Church
his Attorney.

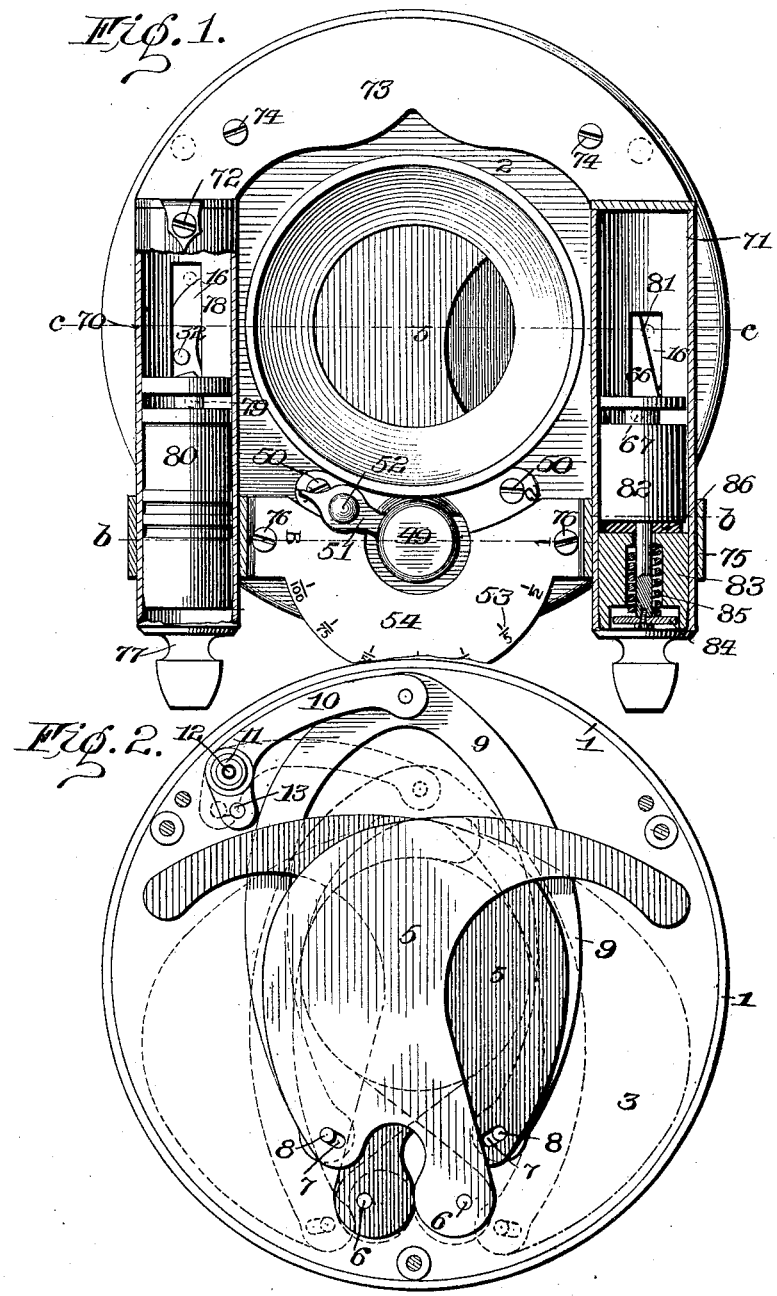

No. 761,771. PATENTED JUNE 7, 1904.
R. KLEIN.
PHOTOGRAPHIC SHUTTER.
APPLICATION FILED DEC. 3, 1900.
MODEL. 5 SHEETS—SHEET 3.
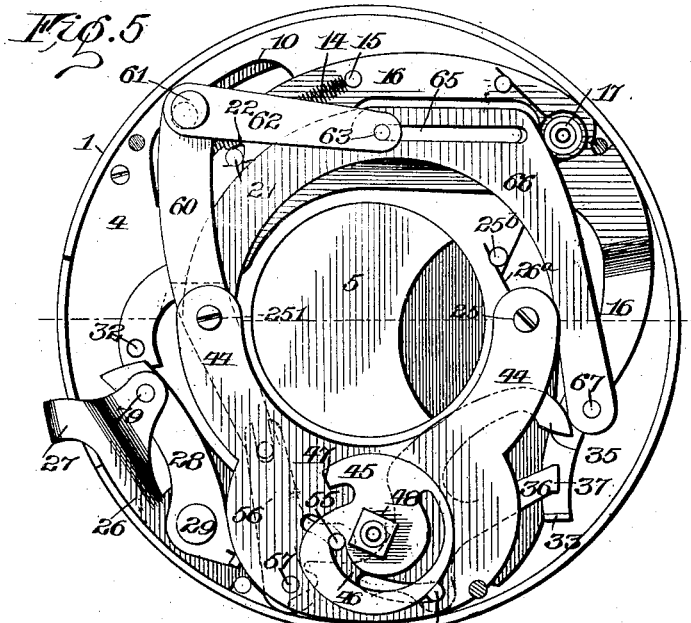
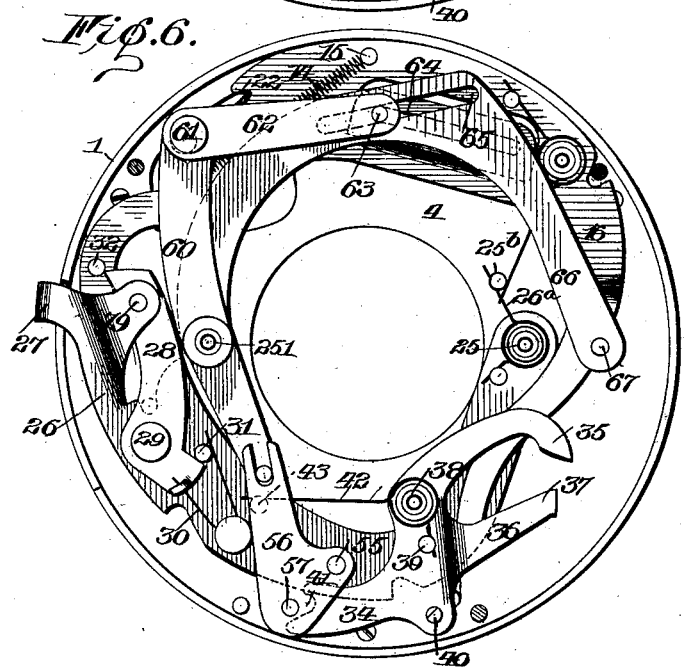
Witnesses. Inventor.
Geo. Willard Rich. Rudolph Klein
Walter B. Payne. by Frederick F. Church
His Attorney.

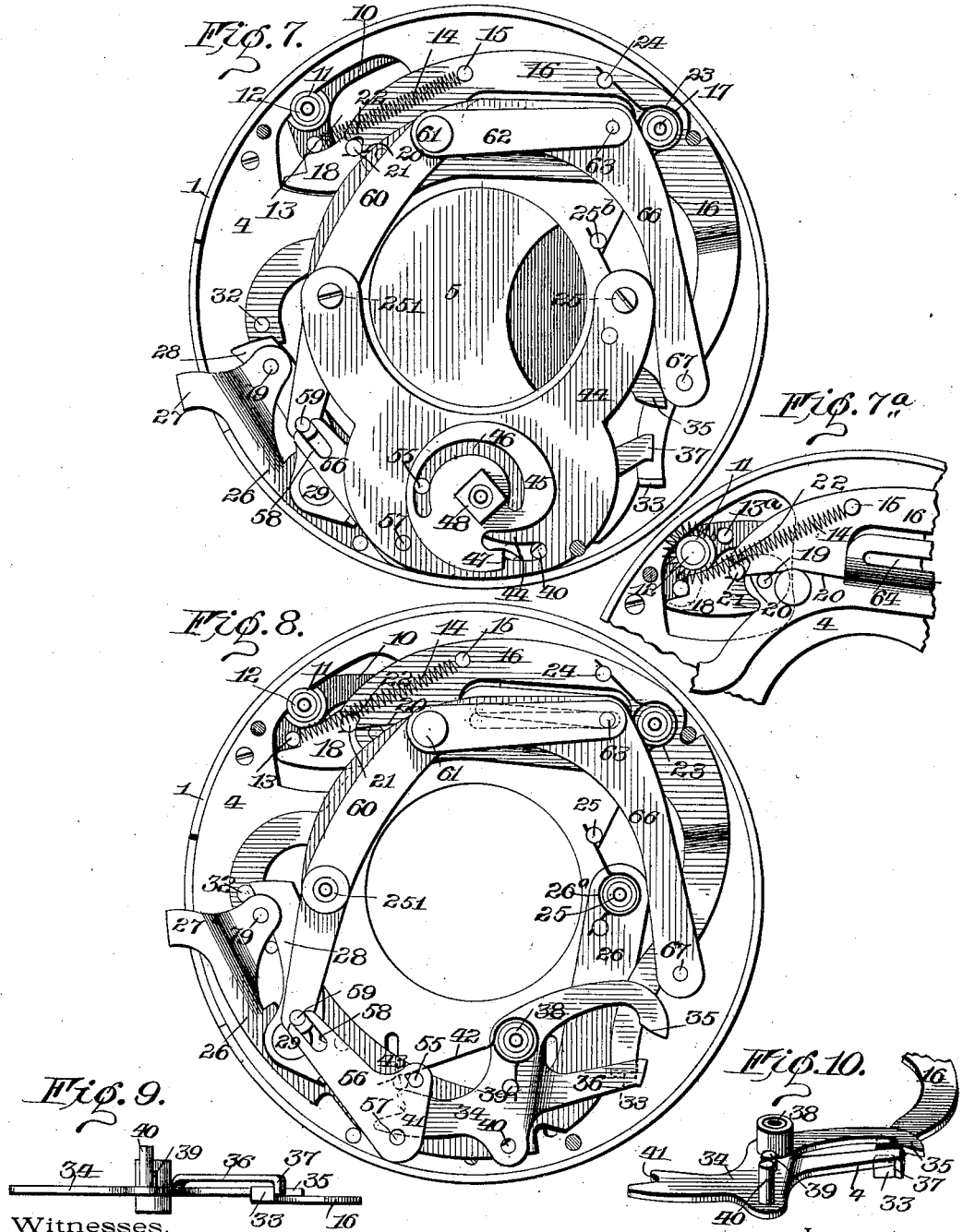

No. 761,771. PATENTED JUNE 7, 1904.
R. KLEIN.
PHOTOGRAPHIC SHUTTER.
APPLICATION FILED DEC. 3, 1900.
MODEL. 5 SHEETS—SHEET 5.
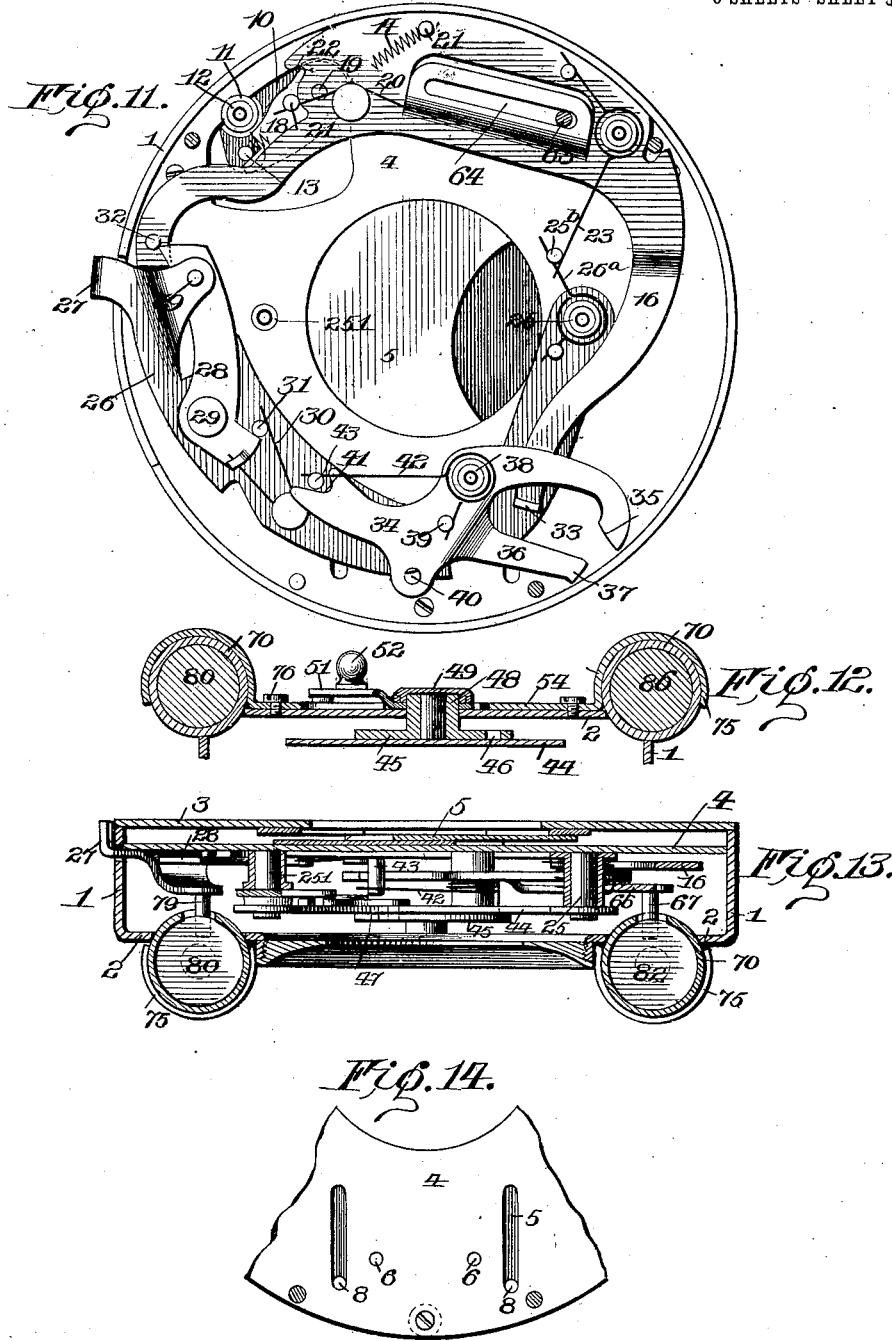
Witnesses.
G. Willard Rich.
Walter B. Payne.
Inventor,
Rudolph Klein
by Frederick Schmidt
his Attorney.
THE NORRIS PETERS CO., PHOTO-LITHO., WASHINGTON, D. C.

No. 761,771. Patented June 7, 1904.

UNITED STATES PATENT OFFICE.

RUDOLPH KLEIN, OF ROCHESTER, NEW YORK, ASSIGNOR TO THE BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 761,771, dated June 7, 1904.

Application filed December 3, 1900. Serial No. 38,436. (Model.)

*To all whom it may concern:*

Be it known that I, RUDOLPH KLEIN, of the city of Rochester, in the county of Monroe and State of New York, have invented certain new and useful Improvements in Photographic Shutters; and I do hereby declare the following to be full, clear, and exact description of the same, reference being had to the accompanying drawings, forming a part of this specification, and to the reference-numerals marked thereon.

My present invention has for its object to provide an improved photographic shutter capable of being set for making time, bulb, and instantaneous exposures and also automatically-timed exposures; and it consists of certain improvements and combinations of parts, all as will be hereinafter fully described and which contribute to the symmetrical appearance, economical construction, and ease and certainty of operation and regulation to produce the desired exposures, or any of them, the novel features being pointed out particularly in the claims at the end of the specification.

In the accompanying drawings, Figure 1 is a front elevation of a shutter embodying my invention, the cylinders of the pneumatic operating and the regulating devices being shown in section; Fig. 2, a view of the shutter wings or plates and their connecting mechanism; Fig. 3, a view of the shutter with the front cover-plate removed, showing the parts set for making a time exposure; Fig. 3ª, a sectional view on the line *a a* of Fig. 3; Fig. 3ᵇ, a view showing a modified form of operating-spring; Fig. 4, a view similar to Fig. 3 with the shutter held open during a time exposure; Fig. 5, a view similar to Fig. 3 with the parts set for making an automatically-timed exposure; Fig. 6, a similar view of the parts just before the shutter is permitted to close when making an automatically-timed exposure; Fig. 7, a view of the operating parts when the shutter is set for making a bulb exposure; Fig. 7ª, a view of the modified form of the operating-spring; Fig. 8, a view of the operating parts with the shutter held open during the making of a bulb exposure; Fig. 9, a side elevation; Fig. 10, a perspective view of the end of the master-lever and the controlling escapement mechanism; Fig. 11, a view of the operating parts with the automatic time-levers or controlling parts removed; Fig. 12, a sectional view on the line *b b* of Fig. 1; Fig. 13, a sectional view on the line *c c* of Fig. 1; Fig. 14, a detail view of one of the plates of the shutter, showing the guides for the shutter-operating pin.

Similar reference-numerals in the several figures indicate similar parts.

While my present invention relates more particularly to the devices for operating and controlling the shutter, and which may be used in connection with shutters of any desired construction, whether of diaphragm, sliding, blind, or other type, I have shown it in connection with a shutter embodying two pivoting wings or plates connected for simultaneous operation, although I do not desire to be confined to either the particular shutter shown or one of the same class, as the invention is capable of application to others.

The main casing of the shutter embodies the circular casing or ring frame 1, having the front plate 2, which may be formed with or separate from the ring frame, and the back plate 3, and the shutters and operating mechanism are preferably mounted upon a central support or plate 4, (shown particularly in Fig. 13,) which plate is provided with a central aperture in line with suitable apertures formed in the front and rear plates, respectively, and which latter plates may, if desired, support the elements or parts of the objective, or the shutter as a whole may in use be located in front or in rear of the objective. The shutter wings or plates (indicated by 5) are pivoted at 6 to the support 4 and are each provided near their pivots with slots 7, in which operate pins 8, connected to the ends of a vertically-movable yoke or plate 9, pivotally connected at its upper end to a lever 10, having a sleeve 11 loosely surrounding the pin or arbor 12, secured to the support 4. The lever 10 is provided with a pin 13, to which is connected one end of a spiral spring 14, the other end being connected at 15 to a master lever or member 16, pivoted to a stud 17, the tendency of the spring 14 being to move the lever 10 and the yoke 9 upward to the position shown in full lines in Fig. 2, and thereby causing the shutter wings or members to overlap the central aperture or axis of the lens. This spring 14 may be connected directly to the pin 13, as shown, or it may pass around the sleeve 11 of the lever and be connected to a pin 13$^a$, as shown in Fig. 7$^a$, this latter construction being the one preferred, as it enables the spring to act upon the sleeve and assist in turning the lever on its pivot as the spring contracts.

18 indicates a shouldered latch or pawl pivoted at 19 to the master member 16 and having its free end thrown upward or outward by the small spring 20, so as to press said pawl normally into contact with the pin 13, the movement of the pawl on its pivot by the spring being limited by the coöperation of stops consisting of the pin 21 and the shoulder 22 on the master member. The master member is normally held in the position shown in Fig. 3 by a suitable spring which is strong enough to overcome the force of the spring 14, that actuates the shutter members to close them, said member-operating spring being either of the form shown in Figs. 3 and 4 and indicated by 23, consisting of a wire coiled around the pivot of the master member and having one free end engaging the pin 24 on the member and the other engaging the pin 25$^b$ on the plate or support 4, or in the form of a spring 23$^a$, such as indicated in Fig. 3$^b$, which last-mentioned spring is coiled around the stationary stud 25 and has one end operating upon a pin 24$^a$ and the other end operating upon a pin 25$^a$, located upon the pivot of the operating member 26. When the operating-spring for the master member is of the form shown in Figs. 3 and 4, I prefer to operate the operating member 26 by a spring 26$^a$, as shown in Figs. 4 and 8.

The operating member 26 is in the form of a curved lever pivoted upon the stud 25 and having an operating end 27, in the present instance extending to the exterior of the casing, but which may be operated to set and release the shutter either by hand or through an intermediate lever, if desired, or by means of a pneumatic operating device hereinafter described. This operating member is provided with a latch or pawl 28, pivoted to it at 29 and operated by a spring 30 against the stop-pin 31, as shown particularly in Fig. 11, and the outer free end of said latch is arranged to coöperate with a stud or pin 32, mounted upon the free end of the master member 16. The construction and arrangement of this latch relative to the end of the master member are such that when the parts are in operating position the latch is beneath the pin or stud 32, but when the operating member is raised the latch will carry up the master member until the shoulder of the latch 18 engages the pin 13 on the shutter-operating lever, said latch 18 turning upon its pivot during its upward movement, and when the master member is released by the latch 28 passing off the pin 32 (the centers of motion of the levers 16 and 26 being different) its spring 23 will throw the outer end downward and the toggle formed by the member and the pawl 18 will be straightened, as shown in Figs. 4 and 8, throwing the shutter open, and if the master member is free to move downwardly the stops 21 and 22 on the latch and member, respectively, will be engaged, and the shoulder of the latch slipping off the pin 13 will permit the spring actuating the lever 10 to close the shutter again. Just before the operating member 26 completes its upward movement the end of the latch 28 slips from the projection 32, as shown in Figs. 6 and 11, so that the master member will be free from it and may be controlled by other means for different kinds of exposures.

The lower rear end of the master member extends downwardly to the bottom of the casing and is provided with a projection 33, preferably formed by turning the end upwardly, with which projection coöperates the detaining member 34. The member 34 is composed, preferably, of an integral structure embodying the arms 35 and 36, the latter having the downwardly-extended end 37 in the plane of the member 26, but the top of said arm being arranged above the plane of said member. The member 34 is pivoted to the stud or projection 38 and is provided on its side with the pins 39 and 40, and its extended end is provided with a notch 41.

42 indicates a spring coiled around the pivot of the detaining member and having one end operating upon the pin 39 to throw the member to the position shown in Fig. 4, the other end of said spring engaging the pin 43 on the operating member 26. The pin or projection 43 upon the operating member is adapted at certain times to coöperate with the notch 41 at the end of the detaining member 34 when time and bulb exposures are being made, as will be explained.

44 indicates a bridge-plate or support arranged in front of the support 4 and secured in any suitable manner, preferably to the posts or studs 25 and 251 and also to other studs or supports at the lower end of the casing, and arranged upon this plate or support 44 and between it and the outer front plate 2 of the casing is a setting device or member in the form of a rotary disk or plate 45, shaped as shown in Figs. 3, 5, and 7, provided with a cam-slot 46 and projection 47 and having its exterior surface substantially round or concentric with the center of motion excepting just in front of the projection 47. At the center of this plate 45 is an angular projection or journal 48, projecting through the front plate 2 and journaled in a recess in the cap or bridge-plate 49, secured by screws 50 to the front of the casing, and mounted upon the stud 48 and between the front plate 2 and the cap-plate 49 is a pointer or index 51, having an operating-handle 52 and arranged to coöperate with a scale 53, located upon a scale-plate 54, as shown in Figs. 1 and 12. The exterior surface of the plate 45 and the projection 47 thereon are arranged to coöperate with the pin 40 on the detaining member 34 to operate and control the position of said member during the making of bulb, instantaneous and timed instantaneous exposures, the plate or bridge 44 being slotted for the passage of said pin 40, and the eccentric slot 46 of the adjusting-plate 45 is adapted to receive the pin 55, mounted upon one end of a lever 56, pivoted at 57 to the casing and having the slot 58 at the other end, in which operates the pin 59 on the lever 60, pivoted upon the stud or projection 251. The upper end of said lever 60 is pivoted at 61 to a link 62, having the pin 63 on its end operating in the slot 64, formed in the master member 16, Fig. 11, and also operated through a slot 65, formed in a lever or member 66, pivoted upon the stud 251 and provided with the pin or projection 67 at its lower end adapted to coöperate with the pneumatic braking or controlling device.

It will be understood that when the setting or adjusting plate 45 is rotated to move the pin 55 toward and from the axis of the plate 45 the point of connection formed by the pin 63 between the master member 16 and the lever 66, connected to the braking or regulating device, will be changed nearer to or farther from the pivot of the master member, and if the braking device affords a constant resistance to the operation of the master member this change in leverage or point of connection will cause variations in the speed of the master member, and thereby vary the speed of operation of the shutter-operating devices.

In the present embodiment the braking device consists of a relatively movable pneumatic cylinder and piston, and the operating member 26 is also actuated, if desired, by a pneumatic engine of the ordinary or any preferred variety, and in order to facilitate the construction and simplify the parts I arrange the operating engine-cylinder 70 and the brake-cylinder 71 upon the exterior of the casing, the upper ends of these cylinders being secured by screws, such as 72, to a curved plate 73, fastened by screws 74 or otherwise to the front of the casing, the lower portions of the cylinders being held in position by loops or curved portions 75 of the index-plate 54, as shown in Figs. 1, 12, and 13, said plate 54 being secured by the screws 76. The lower end of the cylinder 70 is provided with a teat or projection 77 for the application of a flexible tube leading to an operating-bulb, and in the rear side of the cylinder is provided a slot 78, in which operates a pin 79, secured to the operating member 26, said pin projecting into an annular slot formed in the upper end of the piston 80, operating in the cylinder, so that when air is forced in beneath the piston the operating member 26 will be moved upwardly.

The cylinder 71 of the brake device is also provided in its rear side with a slot 81 for the passage of the pin 67, entering a slot or annular recess formed in the piston-rod or portion 82, carrying the piston and located in said cylinder. The lower end of the cylinder 71 is closed, and the piston 83 operating therein is fitted thereto, so that a very small annular space exists around it, allowing the air between the bottom of the cylinder and piston to escape gradually, so that with the same pressure upon the piston the rate of descent would be practically the same. Inasmuch as the piston must be raised in setting the shutter, it is advisable to provide a valve mechanism which will admit air freely below the piston during the upward movement thereof, and I therefore provide the piston with a longitudinal perforation through which extends to the lower end of the piston a rod, and at the extreme end of said rod is provided a plate or disk 84, between which and the piston is arranged a small spring 85, the upper portion of the piston-rod 82 being extended laterally so as to nearly fill the cylinder to assist in guiding the piston in its movement and at any rate sufficiently broad to cover the aperture in the piston and operate as a valve which opens when the piston-rod is moved upwardly and closes when it is moved downwardly, a suitable packing-washer 86 being employed between the parts, if desired, although I find in practice that this is not usually necessary. The operation of the shutter as a whole will now be readily understood.

*Time exposures.*—When it is desired to make a time exposure, the parts are set as shown in Figs. 1 to 4, the index 51 being moved to the position shown in Fig. 1, carrying the projection 47 upon the disk or plate 45 out of the path of the pin 40 on the detaining member, and the pin 55 being moved so that the connecting-pin 63 between the retarding device and the master member is close to the pivot of the latter. When now the operator moves upwardly the operating member 26, either by hand or by the engine, the left end of the master member will be carried upwardly to the position shown in dotted lines in Fig. 4, engaging the pin 13, and when it is released by passing off the end of the latch 32 on the operating member said master member is moved downward by its spring to open the shutter-leaves. During the upward movement of the outer end of the operating member the detaining member is permitted to turn downward to the position shown in dotted lines in Fig. 4 by the removal of the pin 43 from its end, so that when the master member passes off the latch and is returned to open the shutter-leaves the projection 33 will engage and be held by the shoulder at the rear side of the arm 35, as in dotted lines, Fig. 4, until the operating-arm is moved down again by its spring, when the pin 43 thereon will operate the detaining member on its pivot from the position shown in dotted to that shown in full lines, and the end 33 of the master member will then be engaged with the inclined end of the arm or stop 35 and the pin 43 on the operating-lever will be engaged in the slotted end of the detaining member, thereby preventing the master member from operating the latter on its pivot and holding the shutter open. When it is desired to close the shutter, the outer end of the detaining member 26 is moved upwardly, taking the pin 43 out of the slot in the detaining member, (the centers of motion of the parts 26 and 34 being different,) and the spring-operated master member operating on the inclined surface of the arm 35 will raise the latter and return to the position shown in Fig. 3, the latch 18 on the end slipping off the pin 13 and permitting the shutter to close. The straight surface of the arm 35 forms or constitutes a stop which will hold the master member and the inclined surface, a stop or surface which will retain it when the detaining member itself is held, but will enable the master member to release itself by turning the detaining member on its pivot and against the tension of the spring 42 when said detaining member is not held.

*Bulb exposures.*—When it is desired to make a bulb exposure or one in which the shutter is held open while pressure upon the operating member is maintained, the index or pointer 50 is moved over the letter "B" on the scale, the disk 45 then being in the position shown in Fig. 7, with the projection 47 in engagement with the pin 40 on the detaining member and limiting its movement, so that when the operating member is moved upwardly to operate the master member and cause its engagement with the shutter-operating device, as before described, the projection 37 on the detaining member will be brought in the path of the projection 33 on the master member when the latter is released from the operating member and will engage and hold the master member in the position shown in Figs. 8 and 10, the pin 43 engaging the upper rear end or tail of the controlling member and preventing the operating-spring 42 from moving said end vertically until upon the release of the operating member the latter is moved downward by its spring and the pin 43 is moved out of the path of the end of the detaining member, allowing the spring to throw the arm 36 downward far enough to release the master member, the pawl of which moves off the pin 13 and allows the shutter to close.

*Automatically-timed exposures.*—When it is desired to cause the shutter to remain open a predetermined length of time, the index 51 is moved around in line, say, with the numeral 2, (see Fig. 1,) this movement bringing the outer concentric surface of the setting device or plate 45 into engagement with the pin 40 on the controlling member and holding the arms of the latter in the position shown in Fig. 5 out of the path of movement of the master member and the cam-slot in said plate 45 operating upon the pin 55 and the connected parts to move the pin 63, connecting the master member and the lever 66, coöperating with the retarding or braking device, at the extreme end of the slot 65, as shown in Fig. 5, and at the point farthest removed from the pivot 17. When now the operating member 26 is moved up, as before, the master member will be operated upon its pivot, and at the same time, through the connections described, the piston of the braking or retarding device will be moved upward, (air being admitted below the piston by the means described,) and when the operating member has completed its movement the master member will be released and the speed of its return by its operating-spring will be regulated and governed by the escape of air around the piston in the brake-cylinder, and when said master member has moved far enough to cause the pawl 18 to release the pin 13 the shutter will be automatically closed. It will be understood that the length of time the shutter is to remain open is governed by the distance of the pivotal connection between the lever 66 and the master member from their pivots, and this point is regulated by the movement of the cam plate or disk 45.

I do not desire to be confined to the exact details of construction shown and described herein, as these may be varied without departing from the spirit of my invention. The broad feature of providing a single detaining member which is operated and controlled by an operating member is not herein claimed, but forms the subject-matter of a pending application, the present shutter being a different embodiment of the invention contained in said application.

As far as the construction and operation of the detaining and setting devices are concerned it is immaterial whether or not the master member be connected directly or indirectly with the shutter proper, as it is the control of the movement of the master member that determines the kind of exposure and, if it is to be timed instantaneous, its duration.

It will be noted that the operating parts of the shutter are so constructed and arranged that they are, with the exception of the pneumatic cylinders, contained within the circular shutter-casing, thereby presenting a symmetrical appearance.

I claim as my invention—

1. The combination with the shutter proper, the master member coöperating therewith and the operating member having a latch connection with the master member, of a spring-operated detaining member having two stops for coöperating with the master member, a movable setting member operable positively in two directions and coöperating with the detaining member to control its position relatively to the master member.

2. In a photographic shutter, the combination with the master member, of a detaining member adapted to engage the master member and hold it in two positions, a spring for operating the detaining member in one direction and a rotary setting member having the recess, the shoulder and the concentric outer surface, each adapted to be engaged by the detaining member.

3. In a photographic shutter, the combination with the master member, of a detaining member adapted to engage the master member and hold it in two positions, a spring for operating the detaining member in one direction, and a rotary setting member operating directly upon the detaining member to cause it to hold the master member in either position of adjustment or out of the path of the master member.

4. The combination with the pivoted, spring-operated master member, of the operating member pivoted on a different center from the master member and a spring-operated latch pivoted on one of said members and rigid therewith when the member is moved in one direction, adapted to engage the other member and to pass therefrom without the coöperation of other parts during the movement of the operating member in one direction, to cause the movement of the master member against the tension of its spring.

5. In a photographic shutter, the combination with the master member, the operating member coöperating therewith by a latch connection when moved in one direction, a detaining member for engaging the master member holding it in two positions and operated upon by the operating member, and a rotary setting member coöperating directly with the detaining member for adjusting it relatively to the master and operating members.

6. In a photographic shutter, the combination with the shutter, the master member, a latch connection between the shutter and member, an operating member and a latch connection between it and the master member, of a retarding or brake device adjustably connected with the master member, a detaining member for engaging the master member and holding it in two positions and adapted to be actuated and controlled by the operating member, and a setting device coöperating directly with the detaining member for controlling it and controlling the connection between the master member and the braking device.

7. In a photographic shutter, the combination with the shutter proper, the pivoted master member having the projection and a latch connection between the shutter and master member, of the pivoted spring-operated detaining member having the two projections adapted to separately engage the projection on the master member, setting devices for adjusting the detaining member, the pivoted operating member coöperating with the detaining member, and pivoted on a different center from the master member, a latch connection between the operating member and the master member rigid with one of the parts when the operating member is moved in a direction to actuate and automatically release the master member and yielding when said members are operated relatively in the opposite direction.

8. In a photographic shutter, the combination with the shutter proper and exposing mechanism, of the pivoted spring-operated detaining member having the separated arms 35 and 36 and the notched arm, the pivoted spring-operated operating member having the projection thereon and means for controlling the position of the detaining member.

9. In a photographic shutter, the combination with the pivoted shutter-leaves, the yoke connected to said leaves, the lever connected to the yoke and the operating-spring, of the pivoted master member having the latch thereon engaging the lever and a spring for operating the master member on its pivot.

10. In a photographic shutter, the combination with the pivoted shutter-leaves, the yoke pivoted to them and the lever connected to the yoke having the projection and an operating-spring for the lever, of the pivoted master member having the spring-operated latch thereon engaging the projection on the lever and the coöperating projections or stops between the latch and member for causing the disengagement of the latch and pin when the master member is moved in one direction.

11. In a photographic shutter, the combination with the shutter proper, the spring-operated master member and a pneumatic retarding device, of the detaining member having projections adapted to separately engage the master member, the rotary setting member coöperating with the detaining member to cause the engagement of either projection with the master member and having also the cam and connections between said cam and the master member and retarding device for varying the relative pivotal relations of the latter.

12. In a photographic shutter, the combination with the shutter proper, the spring-operated master member, a detaining member having separate projections for holding the master member for time and bulb exposures, a retarding device and variable connections between it and the master member, of the rotary setting-disk coöperating with the detaining member to control its position relative to the master member and having the cam controlling the relation of the retarding device and the master member.

13. In a photographic shutter, the combination with the shutter proper, the spring-operated master member, a detaining member coöperating with the master member, a retarding device and adjustable connections between it and the master member, of the settting-disk having the projection and coöperating with the detaining member and the cam-groove controlling the position of the adjustable connections between the retarding device and master member to vary the movement of the latter.

14. In a photographic shutter, the combination with the master member and the pivoted detaining member having the two projections engaging the former, and the pin thereon, of the retarding device, adjustable connections between the retarding device and master member, the lever controlling said connections and having the pin and the rotary setting member having the concentric surface, the recess, the projection engaging the pin on the detaining member and the slot engaging the pin on the lever.

15. In a photographic shutter, the combination with the spring-operated master member, the spring-operated operating member, the latch connection between them, and the spring-operated detaining member having two stops for engaging the master member and operated upon by the operating member, of a retarding device, variable connections between it and the master member embodying a lever having an operating projection, and a rotary setting member having the concentric portion, the projection controlling the detaining member and the cam-slot engaging the projection on the lever.

16. In a photographic shutter, the combination with the master member, and the operating member, of the detaining member having the arms 35 and 36 adapted to engage the master member, the rear end adapted to engage the operating member and the pin 40, and the setting member adapted to coöperate with the pin 40 and having the projection 47 and the slot.

17. In a photographic shutter, the combination with the slotted master-lever, the retarding device and the slotted lever connected thereto, of the link having the pin operating in said slotted lever, the lever 60 connected to the link, the lever 56 having the pin 55 and the rotary setting-disk having the cam-slot coöperating with the pin.

18. In a photographic shutter, the combination with the casing having the central aperture, the master-lever pivoted on one side of the aperture, the lever pivoted on the other side of the aperture and lapping the master-lever, a retarding device connected to the latter and adjustable and variable connections between the two levers movable toward the pivot of one and from the pivot of the other to vary the amplitude of movement of the retarding device.

19. The combination with the shutter proper, the master member coöperating therewith and having the projection 33 thereon, of the spring-operated detaining member having the arm 35 inclined at the end, the arm 36 having the projection 37 and the slotted end, and the pivoted lever 26 having the pin 43 thereon.

20. The combination with the master member, the detaining devices coöperating with the master member and a retarding device also coöperating with the latter, of a setting device controlling the detaining and retarding devices consisting of the disk having the irregular arbor, the pointer thereon and the cap-plate coöperating with the journal.

21. In a shutter, the combination with the front plate having the aperture, the setting-plate having the arbor extending through the aperture, the pointer on the arbor and the cap-plate extending over the end of the arbor and confining the pointer thereon.

22. In a photographic shutter, the combination with the shutter proper, and operating devices therefor, of a retarding device for the operating devices embodying a closed cylinder, a piston operating therein and a valve in the piston for permitting the free outward movement of the piston in the cylinder.

23. In a photographic shutter, the combination with a shutter proper and operating devices therefor, of retarding devices embodying a cylinder closed at one end, a piston operating therein, a piston-rod connected to the shutter devices and a valve operated by the piston-rod to permit the free movement of the piston in one direction.

24. In a photographic shutter, the combination with a shutter proper and a movable member for controlling its movements, of a retarding device embodying a piston having a valve therein operating in a closed cylinder, said valve opening to admit air beneath the piston when the latter is moved outwardly and adjustable connections between said piston and the movable member.

25. In a photographic shutter, the combination with the shutter, of a retarding device or brake for regulating its speed embodying a closed cylinder, a piston operating therein, a valve in the piston and connections between the shutter and the valve whereby the latter is opened to admit air beneath the piston when the latter is moved outwardly.

26. In a photographic shutter, the combination with the shutter proper and the master member controlling it, of a retarding device for the master member embodying a cylinder, a piston operating therein having a valve, and a rod connected to the member and operating the valve to admit air beneath the piston when the member is operated outwardly.

27. In a photographic shutter the combination with a shutter and operating devices therefor, of a retarding device therefor for regulating the operation thereof embodying the closed cylinder, the piston having the aperture, the valve for closing the aperture and the piston-rod connected to the valve and operated by the shutter-operating devices to move the piston in the cylinder.

28. In a photographic shutter, the combination with the shutter proper and the member connected thereto for controlling its movement, of the piston having the aperture, the piston-rod having the valve closing the outer end of the aperture, the spring engaging the rod and piston and the cylinder closed at one end in which the piston operates.

29. In a photographic shutter, the combination with the casing having the slots therein and operating devices arranged in the casing, of the two pneumatic cylinders having pistons operating therein connected to the operating devices in the casing and detachable securing devices for holding the cylinders upon the outer sides of the casing.

30. In a photographic shutter, the combination with the casing and shutter-operating devices arranged within it, of the two cylinders located upon the exterior of the casing, pistons therein connected with the shutter-operating devices and the plate connecting the cylinders and detachably connected to the exterior of the casing.

31. In a photographic shutter, the combination with the casing and shutter-operating devices arranged within it, of the two cylinders located on the exterior of the casing, pistons therein connected to the shutter-operating devices, the plate connected to the cylinders and to the casing and a plate secured to the casing embracing the cylinders and having the scale thereon, and a movable index controlling the shutter devices and coöperating with the scale-plate.

32. In a photographic shutter, the combination with the shutter proper, of a member or part moving with the shutter to make an exposure, and a pivoted detaining member having two arms, one provided with a shoulder and an incline thereon and the other arm provided with a lug or shoulder, either of said arms being adapted to coöperate separately with the member to control the operation, substantially as described.

33. A photographic shutter comprising a pivotal spring-actuated master-lever, an actuating-lever for the master-lever, a pair of closing blades and an exposure-lever for controlling them, the exposure-lever and the master-lever having directly-engaging projections, substantially as shown and described.

34. In combination with the exposure mechanism of a photographic shutter, an eccentrically-pivoted pivotal master-lever, and an eccentrically-pivoted actuating-lever to engage and move the master-lever, the bearing of the actuating-lever upon the master-lever being adapted to shift as to area during the movements of said levers, substantially as and for the purpose set forth.

35. In a photographic shutter a pair of closing blades, a master-lever adapted to turn either way upon its bearing, an exposure-lever for controlling the closing blades, the master-lever being adapted to move the exposure-lever when turning in one direction and to pass without moving it when turning it in the other direction, and means for actuating the master-lever, said master-lever and actuating-lever being eccentrically pivoted to form a shiftable bearing between them, substantially as and for the purpose specified.

36. In combination with the exposure mechanism of a photographic shutter, a master-lever for operating the exposure mechanism and an actuating-lever for the master-lever, a spring-controlled sway-arm adapted to be engaged by the actuating-lever and to engage the master-lever, said sway-arm being held pivotally independent of the lever mechanism, and means for operating the actuating-lever, substantially as shown and described.

37. In combination with the exposure mechanism of a photographic shutter, a master-lever for operating the exposure mechanism and an actuating-lever for the master-lever, a spring-controlled sway-arm adapted to be engaged by the actuating-lever and to engage the master-lever, the engagement of the sway-arm by the actuating-lever and of the master-lever by the sway-arm being alternated, substantially as shown and described.

38. In combination with the exposure mechanism of a photographic shutter, a master-lever for operating the exposure mechanism and an actuating-lever for the master-lever, a spring-controlled sway-arm adapted to be engaged by the actuating-lever and to engage the master-lever, the actuating-lever causing the sway-arm to move twice during the operation of making an exposure, with interval between, and the action of the sway-arm upon the master-lever being between said two movements of the sway-arm, substantially as and for the purpose specified.

39. In combination with the exposure mechanism of a photographic shutter, a master-lever for operating the exposure mechanism and an actuating-lever for the master-lever adapted to move the latter temporarily and release it, and a spring-pressed sway-arm controlled by the actuating-lever adapted to engage and detain the master-lever after released by the actuating-lever, and means for operating the actuating-lever, substantially as shown and described.

40. In combination with the exposure mechanism of a photographic shutter, a master-lever and an actuating-lever to move the master-lever, a sway-arm having a projection to engage the master-lever, a spring to control the sway-arm, the actuating-lever being adapted to move the sway-arm against the action of the spring to disengage the master-lever, substantially as shown and described.

41. In combination with the exposure mechanism of a photographic shutter, a master-lever and an actuating-lever to move the master-lever, a sway-arm having a projection to engage the master-lever, a spring to control the sway-arm, the actuating-lever being adapted to move the sway-arm against the action of the spring to disengage the master-lever, the actions of the actuating-lever upon the sway-arms being alternated, substantially as set forth.

42. In combination with the exposure mechanism of a photographic shutter, a master-lever, and an actuating-lever adapted to move either way upon its bearing, a sway-arm having a projection to engage the master-lever, and a spring to control the sway-arm, the actuating-lever being adapted to move the master-lever while turning in one direction and to move the sway-arm while turning in the opposite direction, substantially as set forth.

43. A photographic shutter comprising a master-lever and an actuating-lever to control the master-lever, a pair of closing blades and an exposure-lever for controlling the closing blades, and a sway-arm adapted to control the master-lever, the latter being intermediate between said sway-arm and the exposure-lever and simultaneously engaging both, and means for operating the actuating-lever, substantially as specified.

44. In combination with the exposure mechanism of a photographic shutter, a master-lever and an actuating-lever for engaging and moving the master-lever, both of said levers being eccentrically pivoted on different pivots, the bearing between said levers being adapted to cease or terminate while moving substantially as described and shown.

45. In a photographic shutter, the combination with the case and exposing mechanism, of a motor device for operating the exposing mechanism, an operating member for moving said motor device into operative position and operative independent thereof after such movement, a member operative by said operating-lever, having a catch adapted to be thrown into engagement with the motor device during the initial movement of said operating-lever, a spring for actuating said catch-carrying member, and a catch carried by the said member adapted to engage and detain the motor device upon the return movement of said member, whereby the motor device is adapted to be released by a second operation of the operating-lever.

46. In a photographic shutter, the combination with the case and exposing mechanism, of a motor device for operating the exposing mechanism, an operating-lever for moving said motor device into operative position and operative independent thereof after such movement, a catch-lever operative by said operating-lever, a catch carried by said catch-lever, and means for controlling said catch whereby to throw the same into and out of coöperative position.

47. In a photographic shutter, the combination with the case and exposing mechanism, of a motor device for operating the exposing mechanism, an operating member for moving said motor device into position for return action and operative independent thereof after such movement, a lever operated by said operating member and carrying a primary and a secondary catch, a controlling member for said catches adapted to set the shutter for instantaneous, time and bulb exposures.

48. In a photographic shutter, the combination with the exposing mechanism, of an oscillating motor device, having an operating-face terminating in an offset whereby to actuate the exposing mechanism to open the shutter and permit the instantaneous closing of the shutter, and a main operating member having an automatically-releasable connection with the motor device.

49. In a photographic shutter the combination with the case and exposing mechanism, of a motor device for operating the exposing mechanism, an operating member for moving said motor device into operative position and operative independently thereof after such movement, a catch-carrying member operative by said operating-lever, having a catch adapted to be thrown into engagement with the motor device during the initial movement of said operating-lever, a spring for operating said catch-carrying member and a catch carried by said member adapted to engage and detain the motor device upon the movement of the said member in one direction whereby the motor device is adapted to be released by a second operation of the operating-lever.

50. In combination with the exposure mechanism of a photographic shutter, a pivoted master-lever and a pivoted actuating-lever to engage and move the master-lever, said levers being pivoted on different centers and the bearing of the actuating-lever upon the master-lever being adapted to shift as to area during the movements of said levers.

51. In a photographic shutter the combination with a movable master member of a pivoted detaining member having two arms thereon between which the master member moves when making time exposures and adapted to engage the master member, one of said arms having a detaining-shoulder on the inner side and the incline adjacent thereto and the other arm having a projection also adapted to engage the master member, means for adjusting the detaining member, and means for moving it to release the master member.

52. In a photographic shutter the combination with the exposing mechanism of an oscillatory motor device having an operating portion terminating in an offset whereby to actuate the exposing mechanism to open the shutter and permit its instantaneous closing and a main operating member having an automatically-releasable connection with the motor device by a continued movement in one direction and without coöperation with other parts.

53. The combination with the shutter-casing having the aperture, the shutter proper, of the pivoted master member 16 having the latch 18 coöperating with the shutter and the projection 32 at one end and the projection 33 at the other, the operating-lever 26 having the latch 28 therein rigid with the lever when operated in one direction and yielding when they are moved in the opposite direction, the detaining member having two stops adapted to engage the projection 33 and coöperating with the operating-lever and devices for adjusting the detaining member.

54. In a photographic shutter, the combination with the case and exposing mechanism, of a motor device, means for moving said device against its motive action, and means for arresting said motive action to hold the shutter set for operation, a retarding device, a cam-carrying means for throwing said arresting means into and out of action, a cam for controlling the retarding device, and setting means for operating said cams successively in its movement back and forth.

RUDOLPH KLEIN.

Witnesses:
G. WILLARD RICH,
WALTER B. PAYNE.